United States Patent [19]

Kuromitsu et al.

[11] Patent Number: 4,840,544
[45] Date of Patent: Jun. 20, 1989

[54] HYDRAULIC PUMP ASSEMBLY ASSOCIATED WITH ACCUMULATOR

[75] Inventors: Hiromu Kuromitsu, Kariya; Nobuyasu Nakanishi, Toyota; Akira Shirai, Toyota; Noboru Noguchi, Toyota, all of Japan

[73] Assignees: Aisin Seiki Kabushiki Kaisha, Kariya; Toyota Jidosha Kabushiki Kaisha, Toyota, both of Japan

[21] Appl. No.: 214,830

[22] Filed: Jul. 5, 1988

Related U.S. Application Data

[63] Continuation of Ser. No. 826,617, Feb. 6, 1986, abandoned.

[30] Foreign Application Priority Data

| Feb. 6, 1985 | [JP] | Japan | 60-15426 |
| Mar. 26, 1985 | [JP] | Japan | 60-44663 |
| Mar. 26, 1985 | [JP] | Japan | 60-44664 |
| Mar. 26, 1985 | [JP] | Japan | 60-44665 |

[51] Int. Cl.$^4$ .............................. F04B 1/02
[52] U.S. Cl. .................... 417/254; 417/296; 137/513.3
[58] Field of Search ........... 417/254, 534, 267, 296, 417/570, 571; 137/513.3, 513.7; 60/413, 416

[56] References Cited

U.S. PATENT DOCUMENTS

| 212,777 | 2/1879 | Wolf | 417/534 X |
| 1,027,923 | 5/1912 | Spohrer | 417/254 |
| 1,696,436 | 12/1928 | Gray | 417/571 X |
| 1,878,361 | 9/1932 | Ackerman | 137/513.7 X |
| 1,943,102 | 1/1934 | Woodruff | 417/296 X |
| 1,976,098 | 10/1934 | Smith | 417/571 X |
| 2,214,290 | 9/1940 | Ward | 137/513.7 |
| 2,382,717 | 8/1945 | Herzmark | 417/254 X |
| 2,520,674 | 8/1950 | Buschmann | 417/571 X |
| 2,702,008 | 2/1955 | Stockard | 417/267 X |
| 2,924,237 | 2/1960 | Ellis | 137/513.7 X |
| 2,929,400 | 3/1960 | Neff | 137/513.7 X |
| 3,168,044 | 2/1965 | Stevens et al. | 417/571 |
| 3,291,054 | 12/1966 | McKenzie | 417/296 |
| 3,738,111 | 6/1973 | Fletcher | 60/452 |
| 3,754,400 | 8/1973 | Parquet | 60/452 |
| 3,986,795 | 10/1976 | Krane et al. | 417/296 |
| 4,211,078 | 7/1980 | Bass | 60/413 |
| 4,407,640 | 10/1983 | Nanekata | 417/296 |
| 4,459,086 | 7/1984 | Hafele et al. | 417/296 |

FOREIGN PATENT DOCUMENTS

| 242881 | 2/1963 | Australia | 417/296 |
| 507798 | 6/1939 | United Kingdom . |
| 643476 | 9/1950 | United Kingdom . |
| 1530967 | 11/1978 | United Kingdom . |

Primary Examiner—Leonard E. Smith
Attorney, Agent, or Firm—Oblon, Spivak, McClelland, Maier & Neustadt

[57] ABSTRACT

A hydraulic pump assembly for use in combination with an accumulator comprises a pump housing provided with an inlet port for connection to a fluid reservoir and an outlet port for connection to the accumulator, a single cam shaft rotatably mounted within the housing to be driven by an electric motor, a first plunger pump assembly of large displacement capacity including a first plunger axially slidably disposed within the housing perpendicularly to the cam shaft to be reciprocated by engagement with the cam shaft, and a second plunger pump assembly of small displacement capacity including a second plunger axially slidably disposed within the housing perpendicularly to the cam shaft to be reciprocated by engagement with the cam shaft and opposed to the first plunger. An exhaust check valve of the first plunger pump assembly is interconnected to a suction check valve of the second plunger pump assembly.

6 Claims, 5 Drawing Sheets

1

HYDRAULIC PUMP ASSEMBLY ASSOCIATED WITH ACCUMULATOR

This application is a Continuation of application Ser. No. 06/826,617, filed on Feb. 6, 1986, now abandoned.

BACKGROUND OF THE INVENTION

1. Field of the Invention

The present invention relates to a hydraulic pump assembly for use in combination with an accumulator for supplying hydraulic fluid under pressure to the accumulator through an inlet check valve associated thereto.

2. Discussion of the Background

In the case that the accumulator is in the form of a gas type accumulator adapted to a hydraulic control system, a small amount of gas leaks out through a diaphragm of the accumulator and is mixed with the hydraulic fluid under pressure in the accumulator. When the hydraulic fluid is circulated with the gas into a fluid reservoir through the hydraulic control system, there occur fine air bubbles in the fluid reservoir. Subsequently, the air bubbles are inevitably sucked into the hydraulic pump, resulting in a decrease in pumping efficiency of the pump due to compression thereof. For this reason, a conventional hydraulic pump of small displacement capacity does not produce sufficient hydraulic pressure for the control system.

SUMMARY OF THE INVENTION

It is, therefore, a primary object of the present invention to provide an improved two-stage hydraulic pump capable of producing sufficient hydraulic pressure in a compact construction.

Another object of the present invention is to provide an improved two-stage hydraulic pump suitable for use in combination with a gas type accumulator for an anti-skid apparatus in automotive vehicles.

According to the present invention, the foregoing objects are accomplished by providing a hydraulic pump assembly for use in combination with an accumulator for supplying hydraulic fluid under pressure into the accumulator through an inlet check valve associated thereto, which comprises a pump housing provided with an inlet port for connection to a fluid reservoir and an outlet port for connection to the accumulator through the inlet check valve, a single cam shaft rotatably mounted within the pump housing to be driven by a power source such as an electric motor, a low pressure plunger pump assembly of large displacement capacity having a first cylinder mounted within the pump housing perpendicularly to the cam shaft, a first plunger axially movably disposed within the first cylinder to be reciprocated by engagement with the cam shaft, a first suction check valve arranged to cooperate with the first plunger for permitting therethrough flow of hydraulic fluid from the inlet port toward the first plunger, and a first exhaust check valve arranged to cooperate with the first plunger for discharging therethrough the hydraulic fluid pressurized by the first plunger, a high pressure plunger pump assembly of small displacement capacity having a second cylinder mounted within the pump housing perpendicularly to the cam shaft and opposed to the first plunger, a second plunger axially slidably disposed within the second cylinder to be reciprocated by engagement with the cam shaft, a second suction check valve arranged in communication with the first exhaust check valve to cooperate with the second plunger for permitting flow therethrough of the pressurized hydraulic fluid from the first exhaust check valve toward the second plunger, and a second exhaust check valve arranged to cooperate with the second plunger for discharging therethrough the hydraulic fluid pressurized by the second plunger toward the outlet port.

Preferably, the first suction check valve comprises a cylindrical retainer fixedly coupled with the first cylinder, an axially movable valve plate disposed within the cylindrical retainer, an annular valve seat fixedly coupled with the cylindrical retainer, a cylindrical valve body axially slidably coupled with the annular valve seat, and resilient means for biasing the valve body toward the valve plate, the cylindrical valve body having an annular seat portion cooperable with a flat surface of the valve plate to provide a suction check valve and having an annular flange cooperable with the valve seat to provide a relief valve.

It is also preferable that a closure plug is threaded into the pump housing and fastened to position the first cylinder, the cylindrical retainer and the valve seat in place, wherein the resilient means is a compression coil spring of small pitch interposed between the annular flange of the cylindrical valve body and an inner end of the closure plug to surround an axial bore of the valve body for receiving thereon air bubbles mixed with the hydraulic fluid from the inlet port.

Furthermore, it is preferable that the second cylinder is formed therein with a passage which is communicated at one end thereof with the outlet port and at the other end thereof with a cylindrical slight clearance between the inner circumference of the second cylinder and the outer circumference of the second plunger, wherein a chamber is formed in surrounding relationship with the cam shaft to provide a fluid communication between the cylindrical slight clearance and the inlet port.

BRIEF DESCRIPTION OF THE DRAWINGS

Additional objects, features and advantages of the present invention will become more readily apparent from the following detailed description of a preferred embodiment thereof when taken together with the accompanying drawings, in which.

DESCRIPTION OF THE PREFERRED EMBODIMENTS

Figure 4:
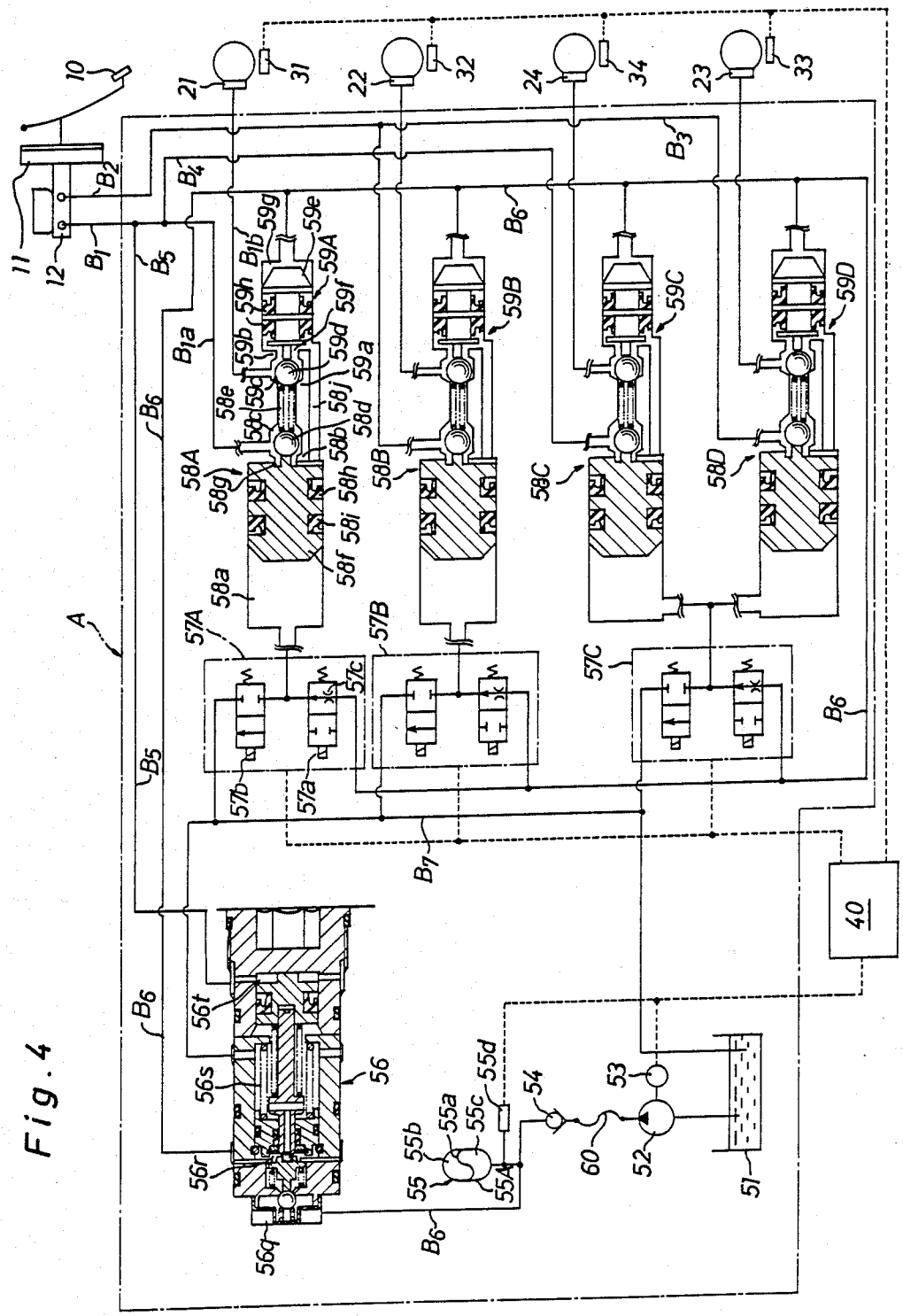
FIG. 4 is a schematic illustration of a braking system provided with the anti-skid apparatus.

Referring now to the drawings, particularly in FIG. 4, there is schematically illustrated a braking system for automotive vehicles which includes a tandem master cylinder 12 equipped with a booster 11 to be activated by depression of a brake pedal 10. The tandem master cylinder 12 has a front pressure chamber connected to a left-hand front wheel brake cylinder 21 by way of a hydraulic circuit $B_1$ and connected to a right-hand rear wheel brake cylinder 24 by way of a bypass circuit $B_4$ of the hydraulic circuit $B_1$. A rear pressure chamber of master cylinder 12 is connected to a right-hand front wheel brake cylinder 22 by way of a hydraulic circuit $B_2$ and connected to a left-hand rear wheel brake cylinder 23 by way of a bypass circuit $B_3$ of the hydraulic circuit $B_2$. Disposed within the hydraulic circuits $B_3$ and $B_4$ is a well known proportioning valve (not shown), respectively.

Figure 1:
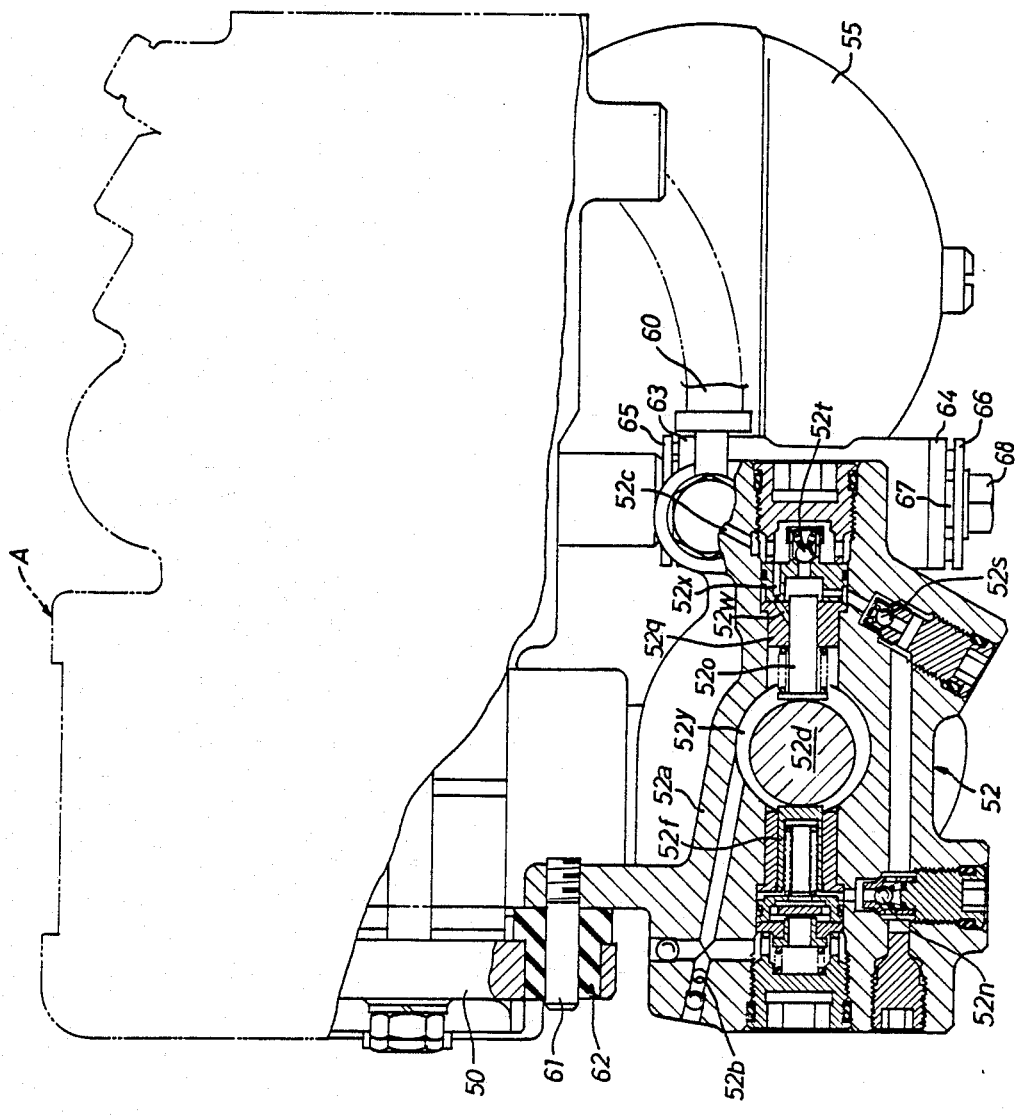
FIG. 1 is a partially broken front view of an anti-skid apparatus, showing a vertical section of a high pressure two-stage pump in accordance with the present invention.
Figure 2:
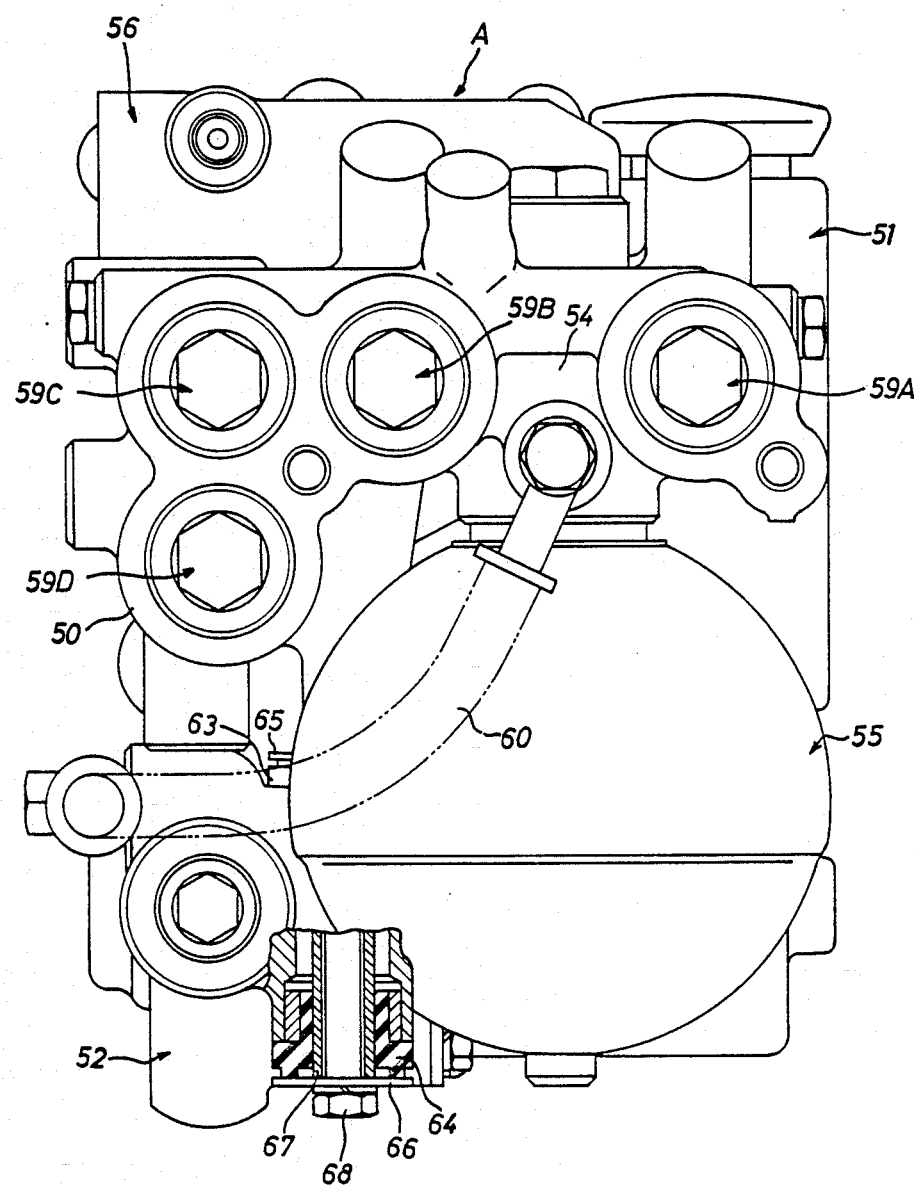
FIG. 2 is a partially broken side view of the anti-akid apparatus shown in FIG. 1.

In the above arrangement of the hydraulic circuits, the braking system includes an anti-skid apparatus A for independently controlling the braking pressures applied to the wheel brake cylinders 21, 22, 23 and 24. The anti-skid apparatus A comprises wheel lock sensors 31, 32, 33 and 34 for detecting the rotational speed of the respective road wheels, and a computer 40 for producing an electric control signals therefrom dependent upon each value of electric signals from the wheel lock sensors. The anti-skid apparatus A further comprises a fluid reservoir 51, a high pressure two-stage pump 52 with a charging mechanism, an electric motor 53, a check valve 54, an accumulator 55, a regulator valve 56, solenoid valves 57A–57C, cut-off valves 58A–58D of the piston type, and bypass valves 59A–59D. As shown in FIGS. 1 and 2, the fluid reservoir 51 is mounted on a common housing body 50 which is formed to contain therein the check valve 54, accumulator 55, regulator valve 56, solenoid valves 57A–57C, cut-off valves 58A–58D and bypass valves 59A–59D. The fluid reservoir 51 is arranged to store an amount of hydraulic fluid to be supplied to the bypass valves 59A–59D and the solenoid valves 57A–57C through the regulator valve 56 by way of a hydraulic circuit $B_6$ The high pressure two-stage pump 52 is connected to the check valve 54 by means of a hydraulic high pressure hose 60 and arranged to be driven by the electric motor 53 for supplying fluid under pressure into the accumulator 55 through the hose 60 and check valve 54. As shown in FIGS. 1 and 2, the two-stage pump 52 comprises a pump housing 52a which has a flange with a lateral support pin 61 threaded thereto and a vertical boss portion with a mounting bolt 68 inserted therein through a rubber bush 64, a sleeve-like collar 67 and an annular plate 66. The support pin 61 is inserted into a cylindrical rubber bush 62 coupled within a side portion of the housing body 50, and the mounting bolt 68 is threaded into a bottom portion of housing body 50 through a rubber bush 63 and an annular plate 65. Thus, the pump housing 52a is resiliently carried in place to prevent the housing body 50 from vibration transmitted thereto from the pump 52 and motor 53.

Figure 3:
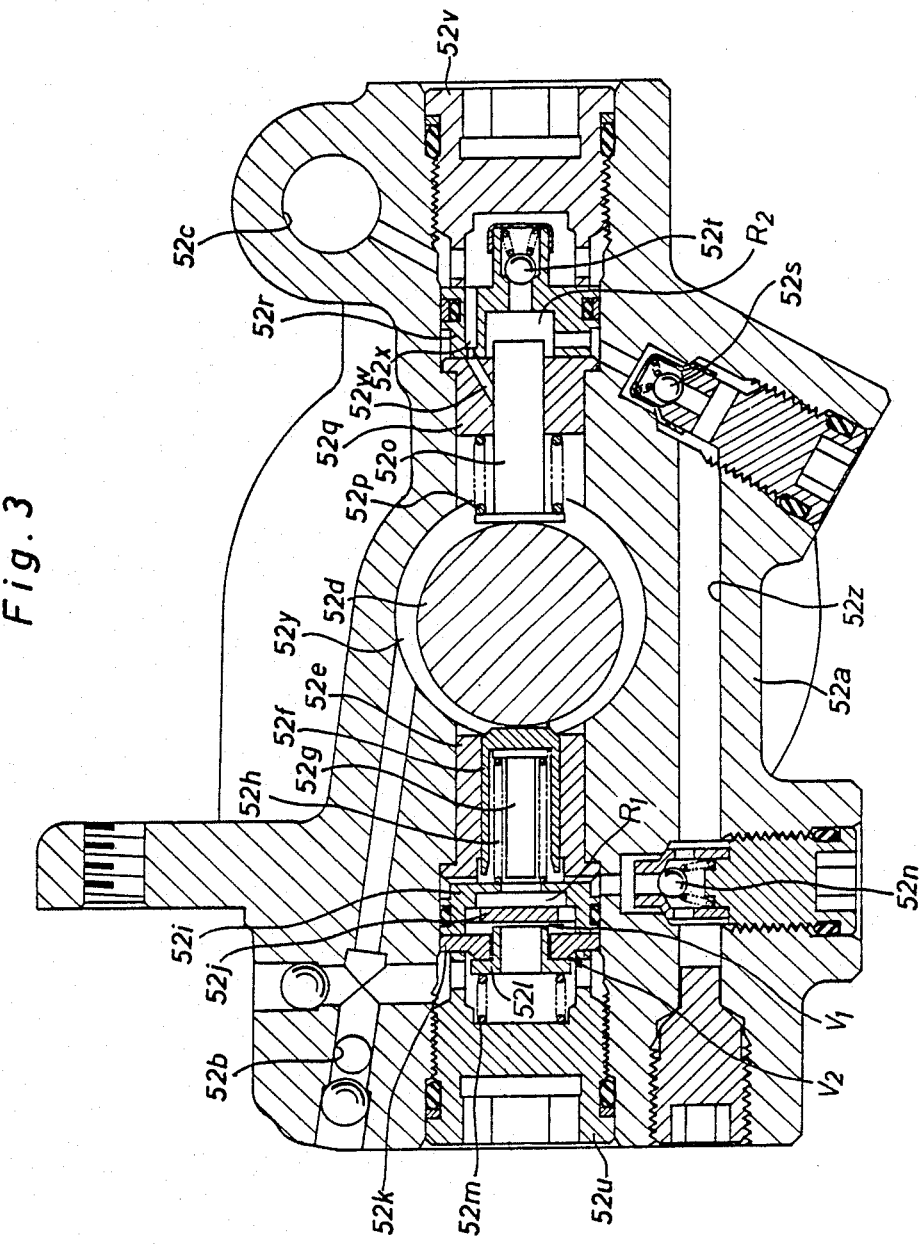
FIG. 3 is an enlarged sectional view of the high pressure two-stage pump shown in FIG. 1.

As can be well seen in FIG. 3, the pump housing 52a is formed with an inlet port 52b in communication with the fluid reservoir 51 and an outlet port 52c in communication with the high pressure hose 60. The two-stage pump 52 comprises a low pressure plunger pump assembly of large capacity which includes a single cam shaft 52d rotatably mounted within the pump housing 52a to be driven by the electric motor 53, a cylinder 52e arranged perpendicularly to the cam shaft 52d and fixed within the pump housing 52a, a hollow plunger 52f disposed within the cylinder 52e to be reciprocated by engagement with the single cam shaft 52d, a retainer 52g disposed within the plunger 52f, a cylindrical retainer 52i fixedly coupled with the cylinder 52e to form radial passages therebetween, and a coil spring 52h interposed between the retainers 52g and 52i to bias the plunger 52f toward the cam shaft 52d. The low pressure plunger pump assembly further includes an axially movable valve plate 52j disposed within an axial stepped bore of retainer 52i, an annular valve seat 52k fixedly coupled with the cylindrical retainer 52i, a cylindrical valve body 52l axially slidably coupled with the valve seat 52k under load of a compression coil spring 52m supported by a closure plug 52u, and a ball type exhaust check valve 52n. The two-stage pump 52 further comprises a high pressure plunger pump assembly of small capacity which includes a cylinder 52q fixedly disposed within the pump housing 52a perpendicularly to the cam shaft 52d, a plunger 52o axially slidably supported by the cylinder 52q and in engagement with the single cam shaft 52d under load of a compression coil spring 52p, a retainer block 42r coupled with the cylinder 52q, a closure plug 52v threaded into the pump housing 52a to retain the cylinder 52q and retainer block 52r in place, a ball type suction check valve 52s disposed within a communication passage 52z between the low and high pressure pump assemblies, and a ball type exhaust check valve 52t assembled within the retainer block 52r. The plunger 52o is formed so as to be smaller in diameter than the left-hand plunger 52f.

In the low pressure plunger pump assembly, the closure plug 52u is threaded into the pump housing 52a and fastened in a liquid-tight manner to position the cylinder 52e, retainer 52i and valve seat 52k in place. The valve plate 52j is formed at its outer periphery with circumferentially equally-spaced recesses. The cylindrical valve body 52l has an annular seat portion which cooperates with a flat surface of valve plate 52j to provide a suction check valve $V_1$. An annular flange of cylindrical valve body 52l cooperates with an annular shoulder of valve seat 52k under load of the coil spring 52m to provide a relief valve $V_2$ for releasing an excessive hydraulic pressure from a low pressure pumping chamber $R_1$ toward a chamber in communication with the inlet port 52b. The retainer 52g and exhaust check valve 52n are provided to reduce the displacement capacity of the low pressure pumping chamber $R_1$ thereby to enhance pumping efficiency of the low pressure pump assembly. In the high pressure pump assembly, the suction and exhaust check valves 52s and 52t are provided to reduce displacement capacity of a high pressure pumping chamber $R_2$ thereby to enhance pumping efficiency of the high pressure pump assembly.

As shown in FIG. 4, the accumulator 55 comprises a diaphragm 55a assembled within an accumulator housing 55A to subdivide the interior of housing 55A into a gas chamber 55b and an accumulator chamber 55c. A pressure switch 55d is associated with the accumulator 55 to detect a hydraulic power pressure in the accumulator chamber 55c of accumulator 55. When the hydraulic pressure in chamber 55c is below a predetermined level, the pressure switch 55d is opened to produce a high level signal therefrom. The computer 40 is responsive to the high level signal from pressure switch 55d to produce a first control signal for energization of a driving circuit (not shown) of the electric motor 53. When the hydraulic power pressure reaches the predetermined level in operation of the two-stage pump 52, the pressure switch 55d is closed to produce a low level signal therefrom. Thus, the computer 40 responds to the low level signal from pressure switch 55d to produce a second control signal for deenergization of the driving circuit of electric motor 53. In this instance, the second control signal from computer 40 acts to deenergize the driving circuit of electric motor after lapse of a predetermined time. As a result, the hydraulic power pressure is accumulated within the accumulator 55 at a higher level than the predetermined level. In addition, the predetermined level is defined to correspond with a maximum hydraulic pressure produced by the master cylinder 12 in braking operation.

Figure 5:
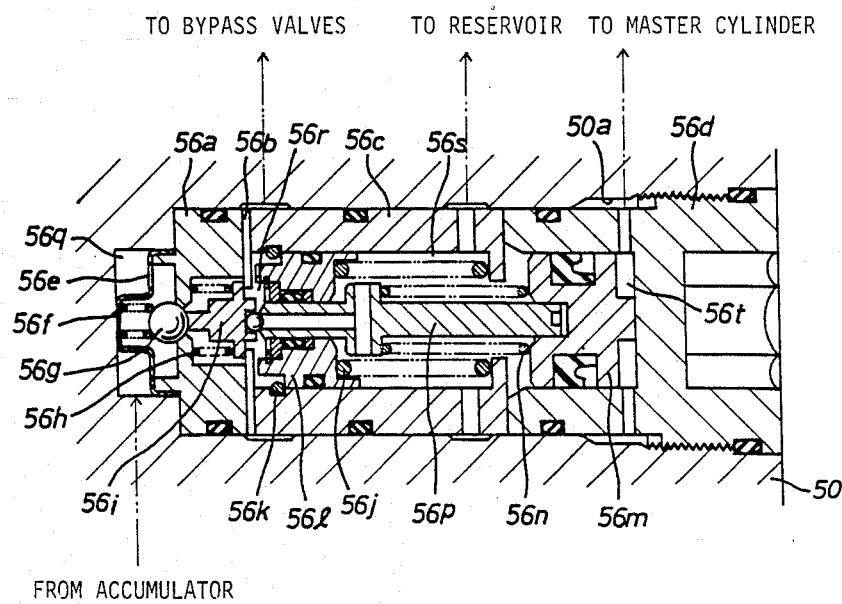
FIG. 5 is an enlarged sectional view of a regulator valve shown in FIG. 4.

As shown in FIGS. 4 and 5, the regulator valve 6 is disposed within the hydraulic circuit $B_6$ to control the hydraulic power pressure applied from the accumulator 55 to the bypass valves 59A–59D and solenoid valves 57A–57C. The regulator valve 56 comprises a valve seat block 56a disposed within a stepped cylinder bore 50a of housing body 50 to form a fluid chamber 56q, an annular stopped plate 56b coupled with the valve seat block 56a, a cylindrical holder 56c disposed within the cylinder bore 50a coaxially with the valve seat block 56a and coupled with the stopper plate 56b, and a closure plug 56d threaded into the cylinder bore 50a to retain the valve seat block 56a, stopper plate 56b and holder 56c in place. The valve seat block 56a is formed with an annular seat portion which cooperates with a ball valve 56g under load of a compression coil spring 56f. A cup-shaped retainer 56e is fixedly coupled with an annular projection of valve seat block 56a to support the coil spring 56f thereon, which retainer 56e is formed with axial holes to permit the flow of hydraulic fluid therethrough. The valve seat block 56e is further formed with an axial bore in which a valve body 56i is arranged to cooperate with the ball valve 56g. The valve body 56i is received by the stopper plate 56b under load of a compression coil spring 56h, and the ball valve 56g is received by a projection of valve body 56i under the load of spring 56f. The stopper plate 56b is formed with circumferentially equally-spaced radial slots which are arranged to permit the flow of hydraulic fluid therethrough.

The regulator valve 56 further comprises a first piston 56l axially slidably disposed within the cylindrical holder 56c to form fluid chambers 56r and 56s, a second piston 56m axially slidably disposed within an axial bore of closure plug 56d to form a fluid chamber 56t, and a spool 56p axially slidably supported by the first and second pistons 56l and 56m. The first piston 56l is loaded by a compression coil spring 56j toward the valve seat block 56a and is engaged with a retainer ring 56k fixed to the cylindrical holder 56c. The spool 56p is loaded by a compression coil spring 56n toward the valve body 56i to cooperate with a small ball valve carried by the valve body 56i. The spool 56p is formed therein with a fluid passage which is arranged to permit the flow of hydraulic fluid between the fluid chambers 56r and 56s. The fluid chamber 56q is in communication with the accumulator 55 through the hydraulic circuit $B_6$, and the fluid chamber 56r is in communication with the bypass valves 59A–59D and solenoid valves 57A–57C through the hydraulic circuit $B_6$ and connectable with the fluid chamber 56q. The fluid chamber 56s is in communication with the fluid reservoir 51 through a hydraulic circuit $B_7$ and connectable with the fluid chamber 56r, and the fluid chamber 56t is in communication with the front pressure chamber of master cylinder 12 through a bypass passage $B_5$ of hydraulic passage $B_1$.

Figure 6:
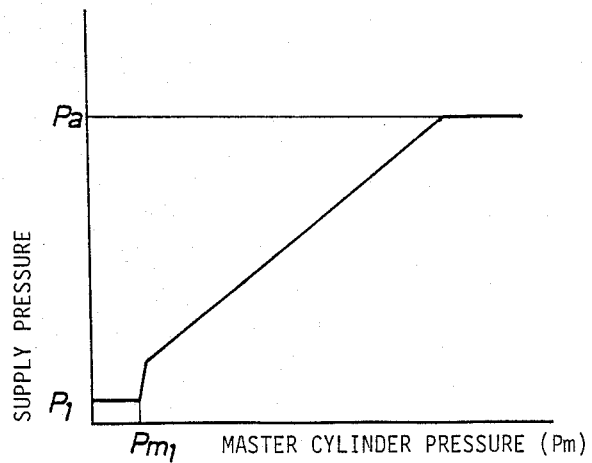
FIG. 6 is the graph illustrating a relative relationship between a master cylinder pressure and a hydraulic supply pressure.

Assuming that the pressure Pm in master cylinder 12 is zero, the ball valve 56g is maintained in engagement with the seat portion of valve seat block 56a to interrupt fluid communication between the fluid chamber 56q and 56r, and the small ball valve in valve body 56i is maintained in engagement with the left end of spool 56p to interrupt fluid communication between the fluid chambers 56r and 56s. Under such condition, a hydraulic pressure $P_1$ remains in the fluid chamber 56r at a level corresponding with the load of spring 56n. (see FIG. 6) When the master cylinder pressure Pm exceeds a predetermined level $Pm_1$ in braking operation, the ball valve 56g, valve body 56i, pistons 56l, 56m and spool 56p cooperate with each other to control the hydraulic pressure in chamber 56r as shown by a characteristic line in FIG. 6. Under such control of the hydraulic pressure in chamber 56r, the hydraulic pressure Pa from accumulator 55 is regulated in accordance with the master cylinder pressure Pm at a higher level than the master cylinder Pm.

The solenoid valves 57A–57C are energized under control of the computer 40 to independently control the hydraulic pressure Pa applied to the respective cut-off valves 58A–58D. As the solenoid valves 57A–57C are substantially the same in construction, only the construction of solenoid valve 47A will be described hereinafter. The solenoid valve 57A comprises inlet and outlet control valves 57a and 57b which are arranged to be simultaneously energized or deenergized. When maintained in a deenergized condition, the inlet control valve 57a is loaded by a spring to communicate the fluid chamber 56r of regulator valve 56 to a fluid chamber 58a of cut-off valve 58A through an orifice 57c, while the outlet control valve 57b is loaded by a spring to interrupt fluid communication between the fluid chamber 58a and the fluid reservoir 51. When energized, the inlet control valve 57a is changed over to interrupt fluid communication between the fluid chambers 56r and 58a, while the outlet control valve 57b is changed over to communicate the fluid chamber 58a to the fluid reservoir 51.

As the cut-off valves 58A–58D are substantially the same in construction, only the construction of cut-off valve 58A will be described hereinafter. The cut-off valve 58A is arranged coaxially with the bypass valve 59A to cooperate with the same. The cut-off valve 58A comprises a ball valve 58d disposed within a valve chamber 58c to cooperate with a valve seat 58b, and a control piston 58f axially slidably disposed within a cylinder bore of housing body 50 through axially spaced cup-shaped sealing members 58i, 58h to form the fluid chamber 58a and a braking pressure chamber 58g. The fluid chamber 58a is in communication with the hydraulic circuit $B_6$ through the solenoid valve 57A, while the valve chamber 58c is in communication with a first section $B_{1a}$ of hydraulic circuit $B_1$. The braking pressure chamber 58g is in communication with a second section $B_{1b}$ of hydraulic circuit $B_1$ through a communication passage 58j and a bypass valve 59A.

When the fluid chamber 58a is applied with the hydraulic power pressure Pa through the inlet control valve 57a of solenoid valve 57A, the control piston 58f is urged rightward to disengage the ball valve 58d from the valve seat 58b thereby to communicate the first section $B_{1a}$ of hydraulic circuit $B_1$ to the second section $B_{1b}$ of hydraulic circuit $B_1$ through the valve chamber 58c, braking pressure chamber 58g, passage 58j and bypass valve 59A. Under such condition, the control piston 58f is positioned to minimize the capacity of chamber 58g or the capacity of first section $B_{1a}$ of the hydraulic circuit $B_1$. When the fluid chamber 58a is connected to the fluid reservoir 51 through hydraulic circuit $B_7$ in response to energization of the solenoid valve 57A, the control piston 58f is moved leftward by the braking pressure applied thereto in chamber 58g to cause engagement of the ball valve 58d with the valve seat 58b thereby to interrupt the fluid communication between the first and second sections $B_{1a}$ and $B_{1b}$ of hydraulic circuit $B_1$. Subsequently, the capacity of chamber 58g is increased by the leftward movement of piston 58f to decrease the braking pressure applied to the wheel brake cylinder 21.

As the bypass valves 59A–59D are substantially the same in construction, only the construction of bypass valve 59A will be described hereinafter. The bypass valve 59A comprises a ball valve 59d disposed within a valve chamber 59c to selectively cooperate with a pair of axially spaced valve seats 59a and 59b, and a piston 59e axially slidably disposed within a cylinder bore of housing body 50 through axially spaced cup-shaped sealing members 59h to form fluid chambers 59f and 59g respectively in communication with the second section $B_{1b}$ of hydraulic circuit $B_1$ and the hydraulic circuit $B_6$. Formed between the valve chambers 58c and 58c is a bypass passage in which a compression coil spring 58e is disposed and engaged at the opposite ends thereof with the ball valves 58d and 58d. When the fluid chamber 59g is applied with the hydraulic power pressure at a predetermined level, the piston 59e is positioned to maintain engagement of the ball valve 59d with the valve seat 59a against the load of compression spring 58e thereby to close the bypass passage and permit fluid communication between the chamber 59c and 59f. Under such normal condition, the fluid under pressure from the braking pressure chamber 58g is supplied into the second section $B_{1b}$ of hydraulic circuit $B_1$ through the passage 58j and chambers 59f and 59c.

If the hydraulic power pressure drops below the predetermined level due to damage of the pump 52, motor 53, hydraulic circuit $B_6$ or the like, the piston 59e will be applied with the braking pressure from the chamber 59g of cut-off valve 58A prior to engagement of the ball valve 58d with the valve seat 58b. Thus, the piston 59e will be moved rightward by the difference in pressure between the chambers 59f and 59g so that the ball valve 59d is disengaged from the valve seat 59a to permit bypass flow of the fluid under pressure across the bypass passage between the valve chambers 58c and 59c. In such a condition, the ball valve 59d will be engaged with the valve seat 59b to block reverse flow of the fluid under pressure into the chamber 59f from the valve chamber 59c. Simultaneously, the control piston 58f of cut-off valve 58A will be moved leftward due to decrease of the hydraulic power pressure in chamber 58a. As a result, the ball valve 58d will be engaged with the valve seat 58b to block flow of the fluid under pressure into the chamber 58g from the valve chamber 58c so as to ensure operation of the wheel brake cylinder 21.

As described above, the computer 40 is responsive to the low and high level signals from the pressure switch 55d to control the operation of electric motor 53. The computer 40 is further responsive to electric signals from the wheel lock sensors 31, 32, 33 and 34 to detect rotation of the respective road wheels in braking operation. Assuming that the left-hand front road wheel tends to be locked in the braking operation, the solenoid valve 57A is energized by a control signal from the computer 40 to exhaust the hydraulic power pressure from the chamber 58a of cut-off valve 58A into the fluid reservoir 51. Thus, the cut-off valve 58A act to block communication between the first and second sections of hydraulic circuit $B_1$ and to decrease the braking pressure in the wheel brake cylinder 21. When the road wheel is released from the tendency to be locked, the solenoid valve 57A is deenergized by a control signal from the computer 40 to apply the hydraulic power pressure to the chamber 58a of cut-off valve 58A therethrough. This permits the flow of fluid under pressure between the first and second sections of hydraulic circuit $B_1$ thereby to increase the braking pressure in the wheel brake cylinder 21. Subsequently, the solenoid valve 57A is alternatively energized and deenergized under control of the computer 40 to control the braking pressure in the wheel brake cylinder 21 so as to prevent the road wheel from locking during braking.

From the above description, it is to be noted that in the high pressure two-stage pump 52, the single cam shaft 52d is arranged to be driven by the electric motor 53 for alternatively reciprocating the plungers 52f and 52o of the low and high pressure plunger pump assemblies. With such an arrangement of the single cam shaft 52d, the two-stage pump 52 can be manufactured at a low cost in a compact construction and mounted in a limited space of the anti-skid apparatus A. The two-stage pump 52 is further characterized in that the plungers 52f and 52o are respectively opposed to the single cam shaft 52d in such a manner as to permit stopping of the cam shaft 52d in an appropriate position. This is effective to reduce electric load acting on the brush part of motor 53 in repetitive starting of the motor 53.

Furthermore, the two-stage pump 52 is characterized in that the suction check valve $V_1$ and relief valve $V_2$ are arranged between the inlet port 52b and the pumping chamber $R_1$ and composed of the valve plate 52j, valve seat 52k, cylindrical valve body 52l and coil spring 52m and that the coil spring 52m is formed to be small in pitch. In this arrangement, the cylindrical valve body 52l is adapted as a valve seat for the suction check valve $V_1$ and as a valve body for the relief valve $V_2$ to reduce the components of the low pressure pump assembly. During operation of the low pressure pump assembly, the hydraulic fluid from inlet port 52b flows through the coil spring 52m and is sucked into the pumping chamber $R_1$ through the axial bore of valve body 52l. In this instance, even if air bubbles are mixed with the hydraulic fluid, the coil spring 52m will receive the air bubbles thereon to prevent entry of them into the pumping chamber $R_1$. This is effective to prevent decrease of pumping efficiency of the low pressure pump assembly.

As is understood from the above description, the suction check valve $V_1$ includes the axially movable valve plate 52j which cooperates with the annular valve seat portion of cylindrical valve body 52l. In operation, the valve plate 52j is applied at its rear surface with hydraulic pressure in exhaust stroke of the plunger 52f to rapidly engage the annular valve seat portion of valve body 52l at its front flat surface. In this instance, even if the valve plate 52j is engaged at a portion thereof with the annular valve seat portion of valve body 52l, the former will be accurately engaged with the latter owing to the hydraulic pressure acting thereon. For this reason, it is able to effect rapid engagement of the valve plate 52j with the annular valve seat portion of cylindrical valve body 52*l* without any spring load acting on the valve plat 52*j*. This means that suction resistance of the valve plate 52*j* is reduced to enhance pumping efficiency of the two-stage pump 52.

In the high pressure pump assembly of two-stage pump 52, the cylinder 42*q* is formed with an inclined axial passage 52*w*, and the retainer block 52*r* is formed with an axial passage 52*x* which is in communication with the passage 52*w* at its one end. The inclined axial passage 52*w* is in communication with a cylindrical slight clearance between the inner circumference of cylinder 52*q* and the outer circumference of plunger 52*o*. The axial passage 52*x* is provided therein with an orifice and communicates at its other end with the high pressure hose 60 through the outlet port 52*c*. In such arrangement of the cylinder 52*q* and retainer block 52*r*, the cylindrical slight clearance between the cylinder 52*q* and plunger 52*o* is predetermined so as to permit the flow of pressurized fluid from the high pressure hose 60 into a chamber 52*y* through the passages 52*x* and 52*w* without causing any unwanted influence to the performance of pump 52. The chamber 52*y* is formed in surrounding relationship with the cam shaft 52*d* and in communication with the inlet port 52*b*. In operation, the two-stage pump 52 is stopped after accumulation of the predetermined hydraulic power pressure in the accumulator 55. In this instance, the pressurized fluid in the passage between the check valves 52*t* and 54 flows into the chamber 52*y* through the passage 52*x* and 52*w* and the cylindrical slight clearance around plunger 52*o*. This is effective to release excessive hydraulic pressure in the high pressure hose 60 after stopping of the pump 52.

In the above embodiment, it is further noted that the regulator valve 56 is disposed within the hydraulic circuit B$_6$ to decrease the hydraulic power pressure in accordance with decrease of the master cylinder pressure Pm in braking operation. Thus, the bypass valves 59A-59D and solenoid valves 57A-57C are applied with the decreased hydraulic power pressure under control of the regulator valve 56. For this reason, it is possible to restrain pressure change in the respective chamber 58*a* of cut-off valves 58A-58D to thereby restrain the occurrence of shocks and noises. Such control of the hydraulic power pressure is effective to decrease consumption of the accumulated hydraulic power pressure in accumulator 55. Under an inoperative condition of the master cylinder 12, the regulator valve 56 is conditioned to disconnect the accumulator 55 from the bypass valves 59A-59D and solenois valves 57A-57C so as to decrease the power pressure in the hydraulic circuit between the regulator valve 56 and the solenoid valves 57A-57C and maintain it at the minimum level P$_1$. This is effective to decrease the load acting on the sealing members in bypass valves 59A-59D and solenoid valves 57A-57C and to retain the pistons 58*f* and 58*e* in their initial positions.

Having now fully set forth both structure and operation of a preferred embodiment of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A hydraulic pump assembly for us in combination with an accumulator for supplying hydraulic fluid under pressure into the accumulator through an inlet check valve associated thereto, comprising:

a pump housing provided with an inlet port for connection to a fluid reservoir and an outlet port for connection to said accumulator through said inlet check valve;

a single cam shaft rotatably mounted within said pump housing to be driven by a power source;

a first pump assembly of large displacement capacity including a first cylinder provided within said pump housing perpendicularly to said cam shaft, a first plunger axially movably disposed within said first cylinder for reciprocation by engagement with said cam shaft, a first suction check valve arranged to cooperate with said first plunger for permitting therethrough flow of hydraulic fluid from said inlet port toward said first plunger, a relief valve associated with said first suction check valve to release excessive hydraulic pressure from a pump chamber between said first suction check valve and said first plunger into a chamber in communication with said inlet port, and a first exhaust check valve arranged to cooperate with said first plunger for discharging therethrough the hydraulic fluid pressurized by said first plunger; and a second plunger pump assembly of small displacement capacity including a second cylinder provided within said pump housing perpendicularly to said cam shaft, a second plunger axially slidably disposed within said second cylinder for reciprocation by engagement with said cam shaft, a second suction check valve arranged in communication with said first exhaust check valve to cooperate with said second plunger for permitting therethrough the flow of pressurized hydraulic fluid from said first exhaust check valve toward said second plunger, and a second exhaust check valve arranged to cooperate with said second plunger for discharging therethrough the hydraulic fluid pressurized by said second plunger toward said outlet port;

wherein said first suction check valve comprises a cylindrical retainer fixedly coupled with said first cylinder, an axially movable valve plate disposed within said cylindrical retainer movable in response to reciprocation of said first plunger, an annular valve seat fixedly coupled with said cylindrical retainer, a cylindrical valve body axially slidably coupled with said annular valve seat, and resilient means for biasing said valve body toward said valve plate, said cylindrical valve body having an annular seat portion cooperable with a flat surface of said valve plate, wherein said relief valve comprises an annular flange of said valve body cooperable with said valve seat, and wherein the flat surface of said valve plate is adapted to be brought into engagement with the annular seat portion of said valve body only by the hydraulic fluid pressurized by said first plunger.

2. A hydraulic pump assembly for use in combination with an accumulator for supplying hydraulic fluid under pressure into the accumulator through an inlet check valve associated thereto, comprising:

a pump housing provided with an inlet port connected to a fluid reservoir and an outlet port connected to said accumulator by means of a high pressure hose provided therein with said inlet check valve;

a single cam shaft rotatably mounted within said pump housing to be driven by a power source;

a first plunger pump assembly of large displacement capacity including a first cylinder provided within said pump housing perpendicularly to said cam shaft, a first plunger axially movable disposed within said first cylinder to be reciprocated by engagement with said cam shaft, and a first suction check valve arranged to cooperate with said first plunger for permitting therethrough flow of hydraulic fluid from said inlet port toward said first plunger;

a second plunger pump assembly of small displacement capacity including a second cylinder provided within said pump housing perpendicularly to said cam shaft and opposed to said first cylinder, a second plunger axially slidably disposed within said second cylinder to be reciprocated by engagement with said cam shaft, a second suction check valve arranged to cooperate with said second plunger for permitting therethrough the flow of pressurized hydraulic fluid from said first plunger pump assembly toward said second plunger, and an exhaust check valve arranged to cooperate with said second plunger for discharging therethrough the hydraulic fluid pressurized by said second plunger toward said outlet port; and return passage means for permitting hydraulic fluid under high pressure flowing therethrough from a chamber between said exhaust check valve and said inlet check valve toward said inlet port;

wherein said return passage means includes a passage formed in said second cylinder and communicated at one end thereof with said outlet port and at the other end thereof with a cylindrical slight clearance between the inner circumference of said second cylinder and the outer circumference of said second plunger, and a chamber formed in surrounding relationship with said cam shaft to provide fluid communication between said cylindrical slight clearance and said inlet port.

3. A hydraulic pump assembly for use in combination with an accumulator for supplying hydraulic fluid under pressure into the accumulator through an inlet check valve associated thereto, comprising:

a pump housing provided with an inlet port for connection to a fluid reservoir and an inlet port for connection to a fluid reservoir and an outlet port for connection to said accumulator through said inlet check valve;

a single cam shaft rotatably mounted within said pump housing to be driven by a power source;

a first plunger pump assembly of large displacement capacity including a first cylinder provided within said pump housing perpendicularly to said cam shaft, a first plunger axially movably disposed within said first cylinder for reciprocation by engagement with said cam shaft, a first suction check valve arranged to cooperate with said first plunger for permitting therethrough flow of hydraulic fluid from said inlet port toward said first plunger, a relief valve associated with said first suction check valve to release excessive hydraulic pressure from a pump chamber between said first suction check valve and said first plunger into a chamber in communication with said inlet port, and a first exhaust check valve arranged to cooperate with said first plunger for discharging therethrough the hydraulic fluid pressurized by said first plunger; and a second plunger pump assembly of small displacement capacity including a second cylinder provided within said pump housing perpendicularly to said cam shaft and opposed to said first cylinder, a second plunger axially slidably disposed within said second cylinder for reciprocation by engagement with said cam shaft, a second suction check valve arranged in communication with said first exhaust check valve to cooperate with said second plunger for permitting therethrough the flow of pressurized hydraulic fluid from said first exhaust check valve toward said second plunger, and a second exhaust check valve arranged to cooperate with said second plunger for discharging therethrough the hydraulic fluid pressurized by said second plunger toward said outlet port;

wherein said first suction check valve comprises a cylindrical retainer fixedly coupled with said first cylinder, an axially movable valve plate disposed within said cylindrical retainer movable in response to reciprocation of said plunger, an annular valve seat fixedly coupled with said cylindrical retainer, a cylindrical valve body axially slidably coupled with said annular valve seat, and resilient means for biasing said valve body toward said valve plate, said cylindrical valve body having an annular seat portion cooperable with a flat surface of said valve plate, wherein said relief valve comprises an annular flange of said valve body cooperable with said valve seat, and wherein the flat surface of said valve plat is adapted to be brought into engagement with the annular seat portion of said valve body only by the hydraulic fluid pressurized by said first plunger.

4. A hydraulic pump assembly as claimed in claim 3, wherein said first plunger is formed larger in diameter than said second plunger.

5. A hydraulic pump assembly as claimed in claim 3, wherein a closure plug is threaded into said pump housing and fastened to position said first cylinder, said cylindrical retainer and said valve seat in place, and wherein said resilient means is a compression coil spring of small pitch interposed between the annular flange of said cylindrical valve body and an inner end of said closure plug to surround an axial bore of said valve body for receiving thereon air bubbles mixed with the hydraulic fluid from said inlet port.

6. A hydraulic pump assembly as claimed in claim 3, wherein said second cylinder is formed therein with a passage which is communicated at one end thereof with said outlet port and at the other end thereof with a cylindrical slight clearance between the inner circumference of said second cylinder and the outer circumference of said second plunger, and wherein a chamber is formed in surrounding relationship with said cam shaft to provide a fluid communication between said cylindrical slight clearance and said inlet port.

* * * * *